Patented Aug. 30, 1949

2,480,790

UNITED STATES PATENT OFFICE 2,480,790

FIREPROOFING COMPOSITION

John Truhlar, Clarendon Hills, and Athan A. Pantsios, Chicago, Ill., assignors to Rudolf F. Hlavaty, Cicero, Ill.

No Drawing. Application July 28, 1945, Serial No. 607,660

1 Claim. (Cl. 106—15)

This invention relates to flameproofing and has for one object to provide a material which can be used for flameproofing fibers—natural and synthetic—textiles, fabrics, felts, batts or other arrangements of fibers. While the materials mentioned are the most important of those which can be flameproofed or fireproofed, they do not include all materials and are mentioned only by way of illustration.

Another object is to provide a flameproofing or fireproofing material which can be used alone or in combination with other materials.

A further object is to provide an organic phosphite for use as a fireproofing agent in itself, or for use as a solvent or plasticizer for synthetic polymers and which will make such synthetic polymers fireproof and will render them flexible and will assist in retaining their flexibility.

Other objects will appear from time to time throughout the specification and claim.

In the past it has been recognized that organic phosphates are useful as plasticizers for fireproofing materials, and they have proven effective as fireproofing agents only when present in very large quantities. This is in itself a disadvantage and a further disadvantage results from the use of organic phosphates—namely, that some of the materials which can be treated by such phosphates remain permanently wet. It is therefore another object of the invention to provide a fireproofing solvent or plasticizer which can be used and which will be effective in relatively small quantities and which will not have the disadvantage of wetting or keeping the materials which are treated by the material of this invention in a wet condition.

We have discovered that organic phosphites are effective fireproofing and flameproofing agents when used in smaller relative quantities than those necessary where the corresponding organic phosphates are used. They have the added advantage that they act as good plasticizers and solvents for synthetic polymers. For this purpose they are as good as the phosphates. In addition the organic phosphites are more water repellant than the corresponding organic phosphates. Organic phosphites are very much less water soluble and therefore will withstand laundering more than the corresponding organic phosphates.

While the organic phosphites have the advantages mentioned when used without other fireproofing or flameproofing materials, they may be used in combination with other such materials or agents—either organic or inorganic—and when so used give greater flameproofing and fireproofing qualities than either of the materials would give alone. Hence a smaller quantity or lesser weight may be used to accomplish satisfactory fireproofing and flameproofing.

We have spoken of the value of adding small amounts of organic phosphites to other fireproofing compositions, and our tests have shown that these advantages occur when small quantities of organic phosphites are added to almost any other fireproofing composition with which they can be combined or mixed, and the materials so treated are rendered not only fireproof and flameproof, but also glowproof—that is to say, the material treated when exposed in air to a flame may be slowly consumed, but if consumed no flame or glow is present. This is an extremely valuable property for fireproofing or flameproofing material, because a glowing material which is being consumed without any flame but which is glowing might spread fire as a result of the glow, by contact with untreated materials. Hence it is important to provide a treatment which makes the material glowproof or non-glowing.

In the past halogenated organic or inorganic materials have been used as fireproofing materials, either alone or in combination with other materials. Such fireproofing materials are potentially corrosive because of the possibility of the formation of a halogen acid from the halogenated material. The presence of an organic phosphite in the composition or upon the material which is treated with such a halogenated composition inhibits the corrosive action of the acid should such an acid be formed.

All of the organic phosphites of the general chemical formulas $R_2PO_3H$ and $R_3PO_3$ where R is of an alkyl or aryl group possess to a substantial degree all of the qualities above enumerated in connection with the general discussion of organic phosphites. Therefore any of them could be used, but certain of them are more desirable than others. Thus it is preferable to use an organic phosphite having a low rate of evaporation if a permanent plasticizing action is desired. In general, the short chain alkyl phosphites are better solvents but poorer plasticizers than the long chain alkyl and aryl phosphites. Therefore the particular organic phosphite which is to be used will be chosen from the group having the properties most desirable for a given use. If a solvent action is of primary importance, one phosphite will be chosen; if a plasticizing action is more important, another phosphite may be chosen; and if both actions are of equal importance, a phosphite will be chosen which has as far as possible suitable plasticizing and solvent actions. Two, or more organic phosphites may be used together to produce the desired action. In our experiments with these compounds we have found certain organic phosphites to be of particular merit for such application; these phosphites are the dimethyl, diethyl, diisopropyl, diamyl and di- and tri-propyl, butyl, hexyl and cyclohexyl phosphites.

Many organic phosphites are now known and are described in the chemical literature. Others can be prepared, if desired, by the interaction of phosphorus trichloride with the sodium salt of the corresponding alkyl or aryl hydroxy compound or with the corresponding hydroxy compound in the presence of organic bases such as pyridine and the like.

It is to be understood that the organic phosphites suggested above may be used in varying proportions and combinations to fireproof and flameproof various materials. Thus if cloth is to be treated, triamyl phosphite may be added in a weight equal to 50% of that cloth and adequate fireproofing and flameproofing will be accomplished. If 15 to 40 parts of triphenyl phosphite is added to 100 parts of antimony trioxide and materials are treated with 20% or more of this mixture by weight, the material is satisfactorily fireproofed and glowproofed as well. It is to be understood that the example given above is in no sense limiting and is merely illustrative of a possible use, weight and proportion. Under some conditions the weights and proportions would be very different.

The addition of 10 to 20 parts of triphenyl or triamyl phosphite to 100 parts of a fireproofing composition consisting mainly of chlorinated wax and chlorinated naphthalene completely eliminates the corrosive tendency of the hydrochloric acid which may be formed on or in the material so treated.

Another use for the fireproofing and flameproofing material disclosed is in connection with films cast from solutions or emulsions of polyvinylacetate. Such films are formed to contain 10% to 20% of tricresyl phosphite and will remain flexible and extremely slow burning.

Some of the organic phosphites may also be used in varnish removers and in solvents for resins and paints and when so used will have the general advantages above described. Among the phosphites suitable for this use are trimethyl, triethyl and triisopropyl phosphites.

Where we have described above various individual or specifically enumerated material, it is to be understood that these are merely typical of materials which may be chosen as desired for a particular purpose from the classes in which these various individual materials are classified.

We claim:

A fireproofing composition consisting essentially of a mixture of chlorinated wax and chlorinated naphthalene together with a fireproofing ingredient effective to inhibit the corrosive action of the chlorinated substances, said fireproofing ingredient including an organic phosphite chosen from the group consisting of $(CH_3)_2PO_3H$, $(CH_3)_3PO_3$, $(C_2H_5)_2PO_3H$, $(C_2H_5)_3PO_3$, (isopropyl)$_2PO_3H$, (isopropyl)$_3PO_3$, (propyl)$_2PO_3H$, (propyl)$_3PO_3$, and the di and tri butyl, amyl, hexyl, cyclohexyl, phenyl and cresyl phosphites, said fireproofing ingredient being present in the composition in substantially the proportions of 10 to 20 parts by weight for each 100 parts of the mixture of chlorinated substances.

JOHN TRUHLAR.
ATHAN A. PANTSIOS.

REFERENCES CITED

The following references are of record in the file of this patent:

UNITED STATES PATENTS

| Number | Name | Date |
|---|---|---|
| 1,936,985 | Lommel et al. | Nov. 28, 1933 |
| 1,975,072 | Booth | Oct. 2, 1934 |
| 1,993,723 | Kyrides | Mar. 5, 1935 |
| 2,005,619 | Graves | June 18, 1935 |
| 2,175,509 | Rogers | Oct. 10, 1939 |
| 2,220,845 | Moyle | Nov. 5, 1940 |
| 2,294,211 | Rothrock | Aug. 25, 1942 |
| 2,299,612 | Clayton et al. | Oct. 20, 1942 |
| 2,307,083 | Thrune | Jan. 5, 1943 |